INVENTOR:
CARL D. HOGG

United States Patent Office 3,334,815
Patented Aug. 8, 1967

3,334,815
METHOD OF CORRECTING IRRIGATION VEHICLE MISALIGNMENT BY USE OF A CLUTCH
Carl D. Hogg, Clovis, N. Mex., assignor to The J. C. Knight Co., Inc., Brownfield, Tex., a corporation of Texas
Original application Nov. 14, 1963, Ser. No. 323,769, now Patent No. 3,281,080, dated Oct. 25, 1966. Divided and this application Sept. 7, 1966, Ser. No. 577,715
4 Claims. (Cl. 239—1)

ABSTRACT OF THE DISCLOSURE

Individual vehicles in a line of irrigation vehicles are driven by a sprocket on a drive shaft which extends along the vehicles. A clutch connects the sprocket to the drive shaft and the vehicle may be disconnected from the drive shaft by disengaging the clutch manually or automatically responsive to detected misalignment.

---

This application is a division of my prior application, Ser. No. 323,769, filed Nov. 14, 1963, since Oct. 25, 1966, Patent No. 3,281,080.

This invention relates to agricultural irrigation and, more particularly, to as system for moving an irrigation sprinkler pipe.

In the operation of agricultural irrigation equipment, it is often desirable to adjust the position of a vehicle carrying an irrigation sprinkler pipe. If the vehicle is rigidly connected to a drive shaft, the vehicle may be moved forward or backward only by skidding the wheels. However, if a clutch is provided between the wheels and the drive shaft, the vehicle may be readily rolled into alignment.

An object of this invention is to provide a clutch mechanism for maintaining the vehicles in alignment.

Further objects are to achieve the above with a device that is sturdy, compact, durable, simple, safe, versatile, and reliable, yet inexpensive and easy to manufacture, install, operate, and maintain.

Still further objects are to achieve the above with a method that is rapid and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale, in which.

Figure 3:
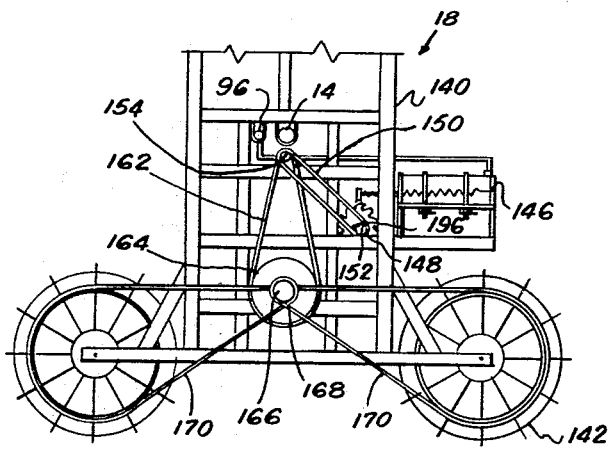
FIG. 3 is a partial side elevational view of a different vehicle with a motor unit mounted thereon.

Referring more particularly to the drawing, vehicles 18 support movable pipe 14 which is adapted to carry sprinklers to dispense water upon the land to be irrigated. Each vehicle includes frame 140 having two ground engaging wheels 142. Also, the vehicles have tower structure 144 from which the cables extend to the movable pipe 14 to support same. The movable pipe 14 is connected to a supply of water under pressure (not shown). Surge line 96 extends alongside the movable pipe 14 to supply water for water motors to power them. One of the vehicles will be designated as the power vehicle (FIG. 3) and has water motor 146 mounted thereon. The water motor is connected to the surge line 96. The water motor rotates an arm which acts through a dog to rotate ratchet 148. The arm is retracted by a spring. Shaft 196 is journaled to the frame 140. Sprocket 152 is attached to the shaft 196 as is the ratchet 148. Chain 150 extends around the sprocket 152 and a sprocket mounted on power shaft 154. With the exception of the more sturdy frame and the water motor 146 and chain 150, the power vehicle is identical with all other vehicles 18 and, therefore, the following description of the vehicle will be identical for all of them.

Figure 1:
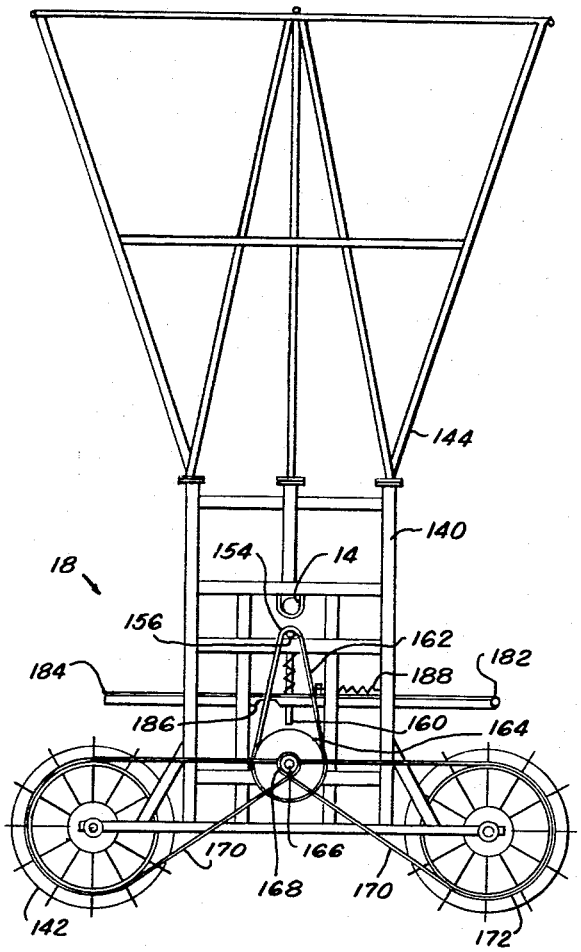
FIG. 1 is a side elevational view of a vehicle according to this invention.
Figure 2:
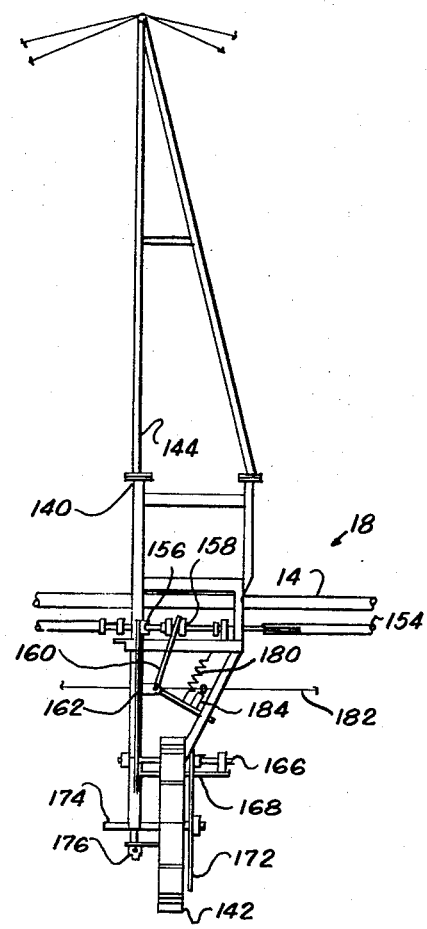
FIG. 2 is a front view of said vehicle, showing pipe, shaft, and cables broken on either side of said vehicle.

Sprocket 156 is mounted for free rotation upon the power shaft 154. (FIGS. 1 and 2). Dog clutch 158 is splined to the power shaft 154 so that it rotates with it, but is free to move axially along it. The position of the dog clutch 158 is controlled by bifurcated lever 160 which is pivoted to frame 140 of the vehicle. Therefore, it may be seen that, if the clutch is in contact with the sprocket 156, it will rotate same. Chain 162 is trained around sprocket 156 and sprocket 164 upon jack shaft 166. The jack shaft 166 also has two small sprockets 168 by which chains 170 are trained around wheel sprockets 172 which are attached to the wheels 142. Thus, it may be seen that transmission means on each vehicle drives the wheels 142 from the shaft and that sprocket 156 is the first element of the transmission means. The wheel axles are mounted on arm 174 which is pivoted to the frame by vertical bolt 176. Therefore, if it is desired to move the entire system with the movable pipe 14 and vehicles 18 along the line longitudinally of the pipe 14, all the wheels may be rotated to a position to move in such a direction by rotating the arm 174 on the bolt 176. Of course, it is necessary to remove sprocket chains 170 to achieve this.

The dog clutch 158 may be disengaged from the sprocket 156 by moving the bifurcated lever 160 manually and a ring is pivoted to the frame to hold the lever in a disengaged position. Therefore, if one of the vehicles is out of line, the dog clutch 158 may be disengaged manually and the vehicle 18 aligned manually. Normally, the clutch 158 is held and engaged with the sprocket 156 by spring 180 extending from the end of the bifurcated lever 160 to a point on the frame 140.

Alignment sensing device in the form of alignment cable 182 is attached to the pipe 14 on either side of the vehicle 18 and extended over one end of cam bar 184. (Shown in FIGS. 1 and 2, but not shown in FIG. 3 for simplicity.) Therefore, if the vehicle 18 gets in front of adjacent vehicles, the pipe will bend slightly and this bend in the pipe will cause the cam bar 184 to move rearwardly. Cam bar 184 is mounted for movement on the frame 140 so that cam 186 thereon will move the bifurcated lever 160 to disengage the clutch 158 from the sprocket 152. Therefore, since the vehicle 18 has no power moving it forward, it will remain stationary until the vehicle 18 again becomes aligned with remaining vehicles. At that time the spring 188 will move the cam bar forward to permit spring 180 to move the bifurcated lever 160 so that the clutch 158 again engages the sprocket 156 to put power on the vehicle 18 again.

It will be apparent that the embodiment shown is only exemplary and that various modifications can be made in operation, construction, materials, and arrangement within the scope of the invention as defined in the appended claims.

I claim as my invention:
1. In an agricultural irrigation system having
   (a) an elongated pipe adapted to be supplied with water under pressure and adapted to dispense water by sprinklers onto the land to be irrigated,
   (b) a plurality of vehicles movingly supporting said pipe,
   (c) a powered main shaft extending along the pipe to the vehicles, and
   (d) transmission means on each vehicle for moving the vehicles responsive to the rotation of said shaft;
   (e) the method of aligning the vehicles comprising:
   (f) temporarily inactivating the power to a vehicle by disconnecting the complete transmission means from said main shaft.

2. The invention as defined in claim 1 with the additional limitation of
(g) detecting if a vehicle is ahead of other vehicles, and
(h) inactivating the transmission responsive to such detection.

3. In an agricultural irrigation system having
(a) an elongated pipe adapted to be supplied with water under pressure,
(b) a plurality of vehicles movingly supporting said pipe, and
(c) a main shaft extending along the pipe to the vehicles;
(d) the method of operation comprising:
(e) dispensing water from the elongated pipe,
(f) rotating the main shaft,
(g) driving the vehicles responsive to the rotation of the shaft, and
(h) temporarily stopping a vehicle by disconnecting it from any driving connection to the shaft at the shaft.

4. The invention as defined in claim 3 with the additional limitation of
(j) detecting if a vehicle is ahead of other vehicles, and
(k) temporarily stopping such vehicle responsive to such detection.

References Cited

UNITED STATES PATENTS

| | | | |
|---|---|---|---|
| 2,604,359 | 7/1952 | Zybach | 239—177 |
| 2,800,364 | 7/1957 | Dick et al. | 239—212 X |
| 2,893,643 | 7/1959 | Gordon | 239—177 X |
| 2,941,727 | 6/1960 | Zybach | 239—212 X |
| 3,001,721 | 9/1961 | Zybach | 239—177 |
| 3,281,080 | 10/1966 | Hogg | 239—212 |

M. HENSON WOOD, JR., *Primary Examiner.*

VAN C. WILKS, *Assistant Examiner.*